US008238008B2

(12) United States Patent
Talbot et al.

(10) Patent No.: US 8,238,008 B2
(45) Date of Patent: Aug. 7, 2012

(54) LASER TRANSMITTER AND METHOD

(75) Inventors: Nicholas Talbot, Ashburton (AU);
James Janky, Los Altos, CA (US);
James F. Gottman, Dayton, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 915 days.

(21) Appl. No.: 12/135,623

(22) Filed: Jun. 9, 2008

(65) Prior Publication Data
US 2009/0304035 A1 Dec. 10, 2009

(51) Int. Cl.
*G02B 26/08* (2006.01)
(52) U.S. Cl. ............... 359/198.1; 359/200.8; 359/210.1
(58) Field of Classification Search .... 359/199.1–203.1, 359/209.1–210.2, 223.1–226.2; 356/139.01, 356/141.1–152.3
See application file for complete search history.

(56) References Cited

U.S. PATENT DOCUMENTS

| 4,062,634 A | 12/1977 | Rando et al. |
| 4,676,598 A | 6/1987 | Markley et al. |
| 4,767,208 A | 8/1988 | Cain et al. |
| 5,946,087 A * | 8/1999 | Kasori et al. ............ 356/249 |
| 6,052,181 A | 4/2000 | Maynard et al. |
| 6,636,653 B2 | 10/2003 | Miracky et al. |
| 6,643,004 B2 | 11/2003 | Detweiler et al. |
| 7,119,316 B2 | 10/2006 | Green et al. |
| 7,224,473 B2 | 5/2007 | Zalusky |
| 7,319,515 B2 * | 1/2008 | Ohtomo et al. ............ 356/139.1 |
| 7,354,167 B2 | 4/2008 | Cho et al. |
| 2005/0190419 A1 * | 9/2005 | Ishihara ................ 359/202 |

OTHER PUBLICATIONS

Lee et al., "Magnetostrictive Micro Mirrors for an Optical Switch Matrix", Sensors 2007, 7,2164-2182, Oct. 9, 2007.
Jain et al., "A Two-Axis Electrothermal SCS Micromirror for Biomedical Imaging", 2003 IEEE/LEOS International Conference on Optical MEMS, Aug. 18-21, 2003, pp. 14-15.

* cited by examiner

*Primary Examiner* — James Phan
(74) *Attorney, Agent, or Firm* — Dinsmore & Shohl LLP

(57) ABSTRACT

A laser transmitter projects a beam of laser light outward while raising and lowering the beam. The beam may define a conical surface of varying inclination. The transmitter includes a laser source that directs a beam generally vertically, and a beam diverting element. The beam diverting element is positioned in the path of the beam, intercepting the beam and redirecting it. The beam emerges from the transmitter as a non-vertical beam that is raised and lowered. The diverting element may include a pair of mirrors configured as a pentaprism, with one of the mirrors pivotable. Alternatively, the diverting element may include a plurality of micro mirrors. Also, the diverting element may include a conical reflector and an annular lens which is cyclically raised and lowered. The beam may be raised and lowered cyclically according to a predetermined schedule, or it may be raised and lowered non-cyclically.

4 Claims, 17 Drawing Sheets

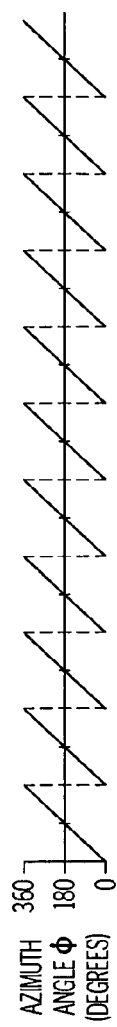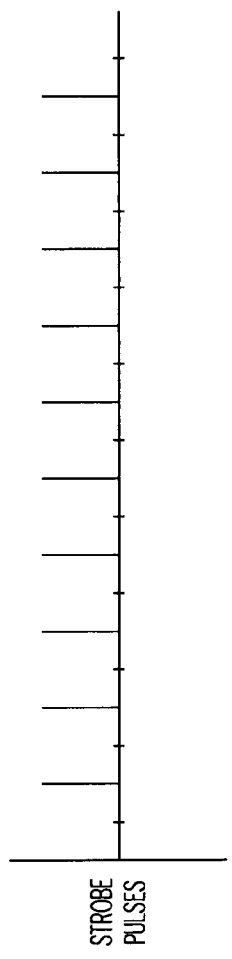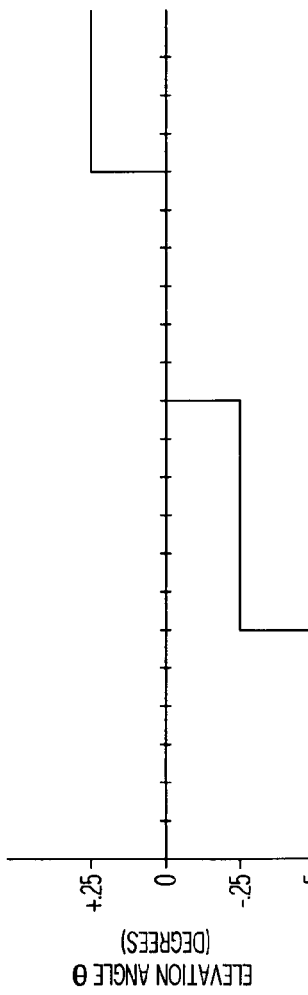

LASER TRANSMITTER AND METHOD

CROSS-REFERENCE TO RELATED APPLICATION

Not applicable.

STATEMENT REGARDING FEDERALLY SPONSORED RESEARCH OR DEVELOPMENT

Not applicable.

BACKGROUND OF THE INVENTION

The present invention relates to a laser transmitter and to a method of operating a laser transmitter. Laser transmitters have been used in a variety of ways in the construction and surveying industries. In a typical application at a construction site, a laser transmitter projects a plane of laser light for use as a position reference by workers, and by various machines carrying laser receivers. The machines may be operated by workers who view position displays, or may be operated automatically or semi-automatically by control systems that respond to the measured positions and elevations, and to a database of desired positions and elevations. The machines may also carry other position detection devices, such as GPS receivers or the like, for supplementing or augmenting the laser system measurement of position.

One type of laser based position and machine control system uses a laser transmitter that projects a thin cylindrical beam of laser light in a horizontal plane or in a precisely tilted plane, and continuously rotates the beam in the plane. A laser receiver, which may include a plurality of photo detectors arranged in a vertical row, is mounted on a mast carried by a construction machine. By sensing the plane of laser light, the machine control system determines the elevation of the receiver, and from that position determines the elevation of various machine elements. A comparison is made between the measured elevations and the desired elevations and the machine is then operated, either automatically or manually, in response to this comparison.

Another type of laser based position and machine control system uses a transmitter that projects a horizontal plane of laser light in all directions simultaneously. To accomplish this, a vertical beam of laser light is projected onto a conical reflector. While providing a very simple construction, a transmitter of this type is somewhat limited in operation and flexibility.

Laser based systems that project a plane of laser light using a rotating beam or a horizontally dispersed plane of light necessarily require that the receiver be relatively precisely positioned to be able to be illuminated by the laser light so that position information can be developed. Some systems address this issue by using a transmitter that projects one or more tilted, fan-shaped beams of laser light, rotated about a vertical axis. While fan beam systems provide for a broader range of coverage, such systems may have other draw backs, including a difficulty in extracting complete position information from the receiver signals. Other systems use vertical arrays of photo detectors with more complex receivers, positioned on extendable masts, to permit detection over a large range of elevations. None of these has proved to be entirely satisfactory because of the difficulty encountered in adjusting mast height to place the receiver in the path of the beam, and the limited amount of vertical movement provided by such a mast.

Accordingly, there is a need for a laser transmitter and method of operating a transmitter in which the operation of the system is simplified, and in which accurate position and control information is readily available over a large range of elevations.

SUMMARY OF THE INVENTION

These needs are met by a laser transmitter according to the present invention for projecting a beam of laser light outward while raising and lowering the beam to define a conical surface of varying inclination relative to horizontal. The beam may be directed outward in all directions, or may be directed outward in less than all directions. The beam may define a cyclically varying conical surface, a non-cyclically varying conical surface, or a surface which changes inclination so as to track a laser receiver. The transmitter includes a laser source directing a beam generally vertically, and a beam diverting element. The beam diverting element is located in the path of the beam, intercepting the beam and redirecting it to emerge from the transmitter as a non-vertical beam that is raised and lowered to define conical reference surfaces. The beam may incrementally change in relative elevation angle according to a timed, predetermined schedule. The laser beam therefore defines a series of time-varying conical surfaces which illuminate a much wider range of heights in the surrounding environment. For example, the elevation angle of the laser beam can be stepped through a series of small changes, each lasting for a short period of time. By knowing the elevation angle of the conical surface of laser light at the particular time when the light is sensed by the laser detector, and knowing the horizontal distance from the laser transmitter to the laser detector, the height of the laser detector relative to the laser transmitter can be precisely determined. The elevation angle of the beam can be varied cyclically according to a predetermined time schedule that is stored in memory of both the laser transmitter and laser detector system. Alternatively, the elevation angle of the beam can be varied by the laser transmitter on some basis, and the elevation angle of the beam communicated to the laser receiver via a continuous radio link. Alternatively, the laser receiver may determine whether the beam needs to be raised or lowered for the receiver to continue to be illuminated, with this information being transmitted via a radio link to the transmitter for appropriate adjustment of the orientation of the laser beam.

The beam diverting element may divert the beam as a thin, cylindrical beam of light. The beam diverting element defines a reflection surface from which the beam is reflected, and a pivot arrangement for altering the orientation of the reflection surface. The beam is raised and lowered while rotating the beam about a generally vertical axis. Alternatively, the beam may be directed in a single azimuthal direction, without being rotated, if desired. A drive motor may be provided for rotating the beam diverting element. The beam diverting element may include a pair of mirrors defining a reflection path, mounted between a pair of side wall supports, with at least one mirror mounted for pivotal movement. The beam diverting element may include at least one piezoelectric element for movement of at least one of the pair of mirrors defining the reflection path.

The beam diverting element may include a plurality of micro mirror devices arranged collectively in the shape of a truncated cone. Alternatively, the beam diverting element may include a plurality of micro mirror devices arranged collectively in the shape of a multi-sided, regular pyramid. The laser transmitter may further comprise a drive motor for cyclically rotating the beam diverting element by less than a full rotation in opposite directions.

The beam diverting element may include a conical reflective surface intercepting the beam and redirecting it outward as a thin, horizontally diverging, generally horizontal beam, an annular lens having a cylindrical inner surface and a convex outer surface, and a piezoelectric element for cyclically raising and lowering the annular lens. The annular lens alters the direction of the beam, such that the beam is raised and lowered. The outer surface of the annular lens may be subdivided into a series of frusto-conical surface segments, each of which extends circumferentially around the outside of the lens, such that all of the light in the beam passes through each surface segment for refraction by the same angle.

A laser transmitter projects a beam of laser light outward while cyclically raising and lowering the beam to define a conical surface of varying inclination. The transmitter includes a laser source directing a beam generally vertically, and a beam diverting element. The beam diverting element is positioned in the path of the beam, intercepting the beam and redirecting it to emerge from the transmitter as a thin, horizontally diverging, generally horizontal beam. A drive motor rotates the beam diverting element. The beam diverting element defines movable reflection surfaces from which the beam is reflected. The reflection surfaces alter the direction of the beam, such that the beam is raised and lowered. The beam diverting element may include a plurality of micro mirror devices arranged collectively in the shape of a truncated cone. The beam diverting element may include a plurality of micro mirror devices arranged collectively in the shape of a multi-sided, regular pyramid. The beam diverting element may include a plurality of micro mirror devices arranged collectively in the shape of an eight-sided, regular pyramid. The beam diverting element may include a plurality of micro mirror devices arranged collectively in the shape of a sixteen-sided, regular pyramid. The drive motor rotates the beam diverting element by less than a full rotation, moving it cyclically in opposite directions.

A method of projecting a beam of laser light may comprise the steps of projecting a beam of laser light outward from a transmitter, and altering the direction of the beam. The beam is raised and lowered to define a conical reference surface of varying inclination. The step of projecting a beam of laser light outward from a transmitter may include the step of projecting a thin, cylindrical beam of laser light outward from the transmitter, and rotating the beam about a generally vertical axis. The step of altering the direction of the beam may include the step of gradually altering the direction of the beam such that it is continuously raised or lowered. Alternatively, the beam may be periodically raised or lowered after it has undergone a predetermined number of rotations at each of a plurality of discrete levels.

Accordingly, it is an object of the present invention to provide a laser transmitter that can project a reference beam of light that defines a reference conical surface that varies in inclination, and a method by which such a transmitter and a cooperating laser receiver operate.

BRIEF DESCRIPTION OF THE DRAWINGS

FIGS. 12A, B and C are a graphical representation of the timing of the operation of the transmitter of FIGS. 1 through 3C;

DETAILED DESCRIPTION OF THE PREFERRED EMBODIMENTS

Figure 1:
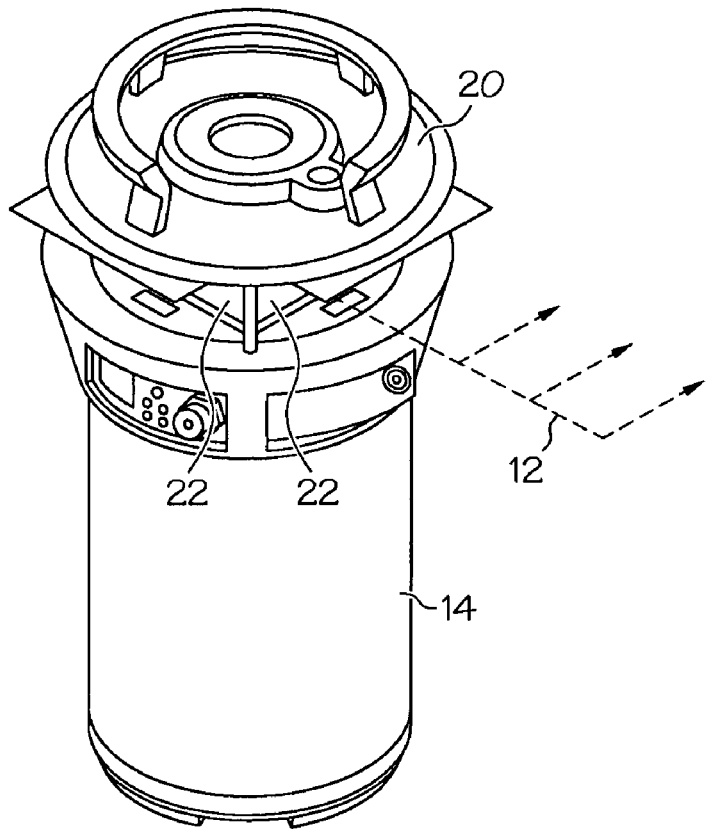
FIG. 1 is a perspective view of the transmitter of the present invention.
Figure 2:
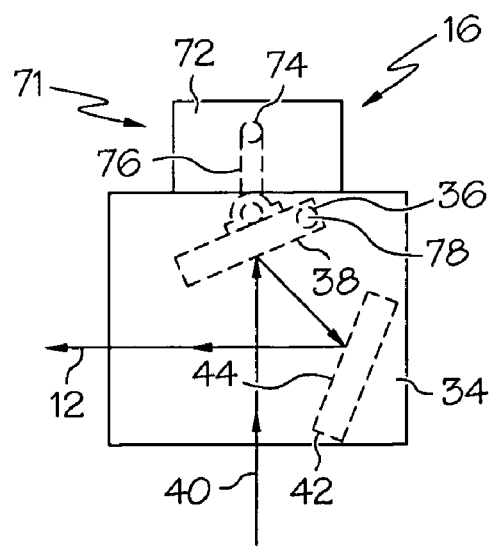
FIG. 2 is a side view of a diverting element according to one embodiment of the present invention.

FIGS. 1-3 of the drawings illustrate a first embodiment of a laser transmitter for projecting laser light according to the present invention. The transmitter projects a beam 12 outward, spinning the beam around a generally vertical axis. The beam defines a varying conical surface that is raised and lowered. As will be described in detail below, the beam may be cyclically raised and lowered while it spins so that it defines a reference conical surface of varying inclination. The beam inclination may be cyclically varied according to a schedule, it may be randomly varied, or it may be varied as needed to keep a receiver illuminated. For example, the beam may be kept aimed in a fixed azimuthal direction, raised and lowered, or directed to a particular deviation angle, as desired. The light defining the reference conical surface may have a very limited range of movement such that it does not move through a horizontal or generally horizontal orientation in which it is generally flat. Alternatively, the beam may move above and below a horizontal orientation. This transmitter apparatus is similar in general respects to that disclosed in U.S. Pat. No. 4,062,634, issued Dec. 13, 1977, Rando et al, which is incorporated herein by reference. The embodiment of FIGS. 1-3 and the Rando et al device both produce rotating laser beams which define reference surfaces of laser light that can be used to determine the relative position of another object, such as a laser receiver. The receiver can be used to check or measure elevations, grades, and dimensions from offset lines, and the like. Further, such a laser receiver may be mounted on a machine, and the position data that is developed from the receiver can be used to control the operation of the machine.

Housing 14 includes a laser which provides a laser beam directed generally vertically. A beam diverting element 16, shown in FIGS. 2, 3A, 3B, and 3C, intercepts the primary beam 40 and redirects the beam so that it emerges from the apparatus as a generally horizontal beam. The beam diverting element 16 diverts the primary beam 40 in a direction which is generally perpendicular to the initial path of the primary beam, thus causing the beam to emerge through one of the glass panels 22 which surround the beam diverting element 16.

Figure 3A:
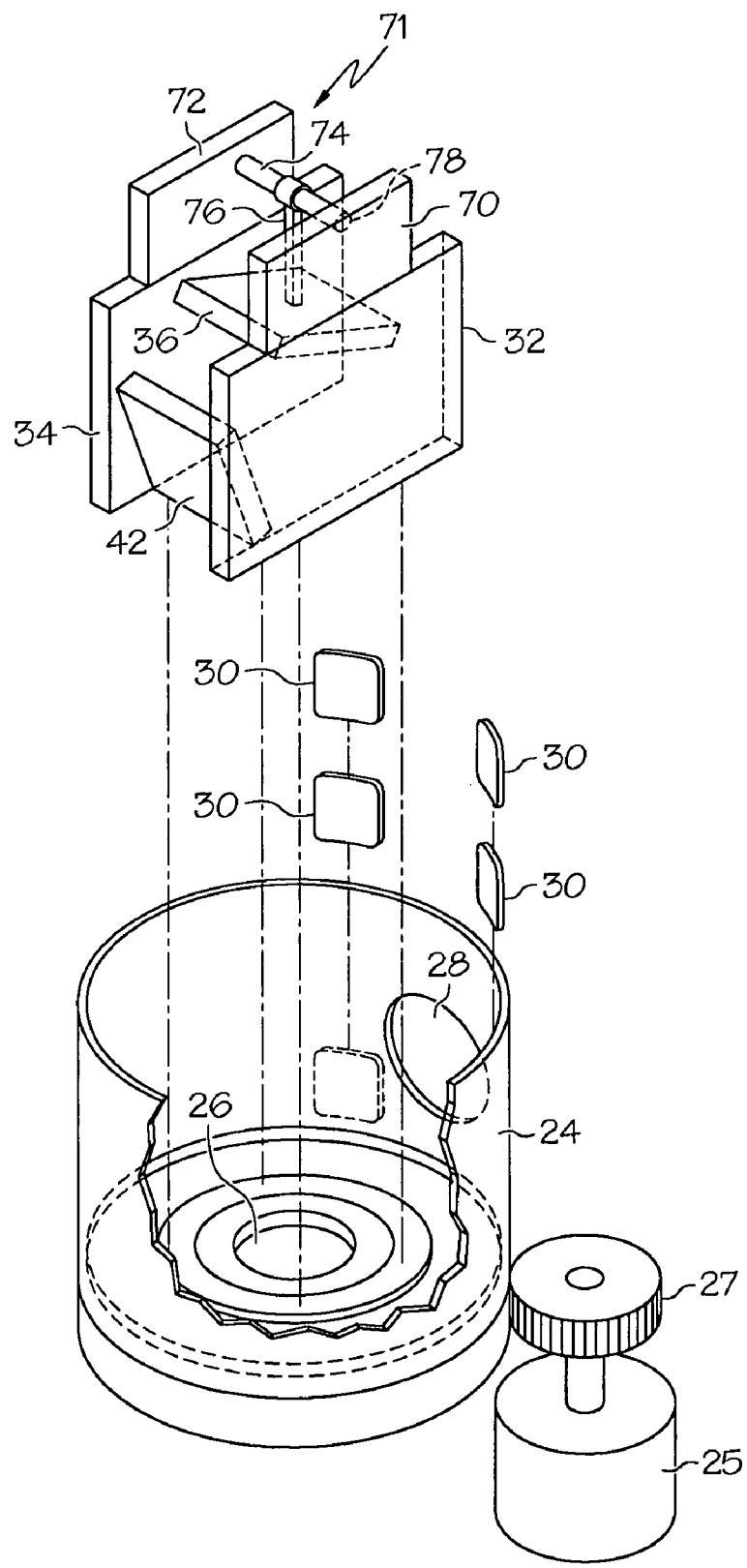
FIG. 3A is an exploded view of the diverting element of FIG. 2 and associated structures.

In the embodiments shown herein, the initial path of the laser beam is depicted as upward. It will be appreciated, however, that the initial path may also be downward. As seen in FIG. 3A, the beam diverting element is mounted in a casing 24 which defines an opening 26 for entrance of the primary laser beam 40 and an opening 28 for exit of the reference beam 12. Casing 24 further includes weights 30 which balance the casing and enhance smooth rotation thereof. The casing 24 in conjunction with a drive motor 25 and a linkage, such as drive gear 27 connected thereto, provide a mechanism for rotating the beam diverting element 16. Various linkage arrangements may be used, such as for example appropriate drive belt and drive pulley arrangements.

Figure 3B:
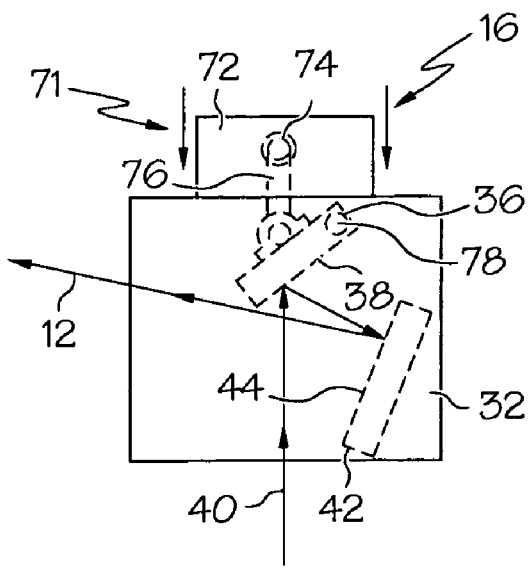
FIGS. 3B and 3C are side views of the diverting element, illustrating the manner in which the direction of the beam is changed.
Figure 3C:
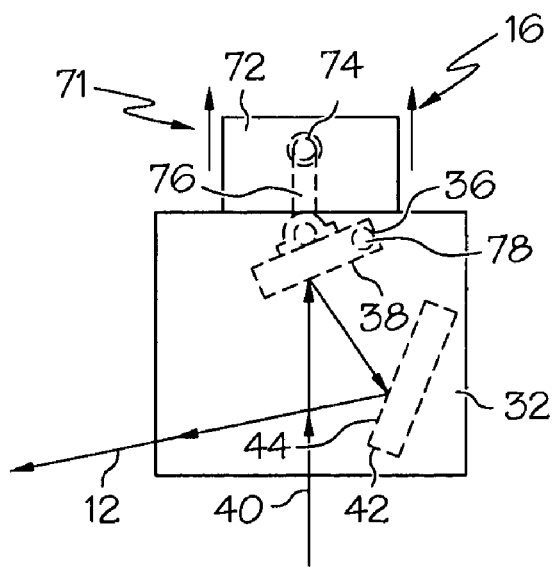

The beam diverting element 16 includes beam deflecting elements that extend between a pair of side plates 32 and 34. FIGS. 3B and 3C show the beam diverting element 16 with the side plate 34 removed. A first beam deflecting element 36 comprises a first mirror defining a first reflection surface 38 oriented at an angle with respect to the initial path of primary beam 40. The first beam deflecting element 36 reflects the primary beam 40 toward a second beam deflecting element 42 which defines a second reflection surface 44. As shown in FIG. 2, reflection surface 44 is oriented at an angle of approximately 45 degrees with respect to the first reflection surface 38 such that it further reflects the primary beam directed to it by mirror 36 in a direction generally perpendicular to the initial path of the primary beam 40. This double reflection in a figure-four pattern is characteristic of pentaprism reflective elements which typically redirect an incoming beam to an outgoing path that is perpendicular to the incoming beam. The double reflection shown in FIG. 2 provides for a redirection at a 90° angle, regardless of the precise orientation of the pentaprism elements with respect to beam 40. As a consequence, using a rotating pentaprism in a laser transmitter eliminates the beam misdirection that might be produced by bearing wear if a rotating mirrored surface, oriented at 45 degrees to the vertical beam, were used to redirect the beam.

The transmitter of FIGS. 1, 2, 3A, 3B, and 3C uses a pentaprism configuration for the beam deflecting element 16 that produces a nominal 90° redirection of the beam. This configuration can also redirect the beam slightly above or slightly below 90°, as well. To effect this upward and downward redirection, a pivot arrangement 71 for altering the orientation of the reflection surface 38 is provided. The pivot arrangement 71 includes a pair of piezoelectric elements 70 and 72 that are mounted on side plates 32 and 34, respectively. Pin 74 extends between piezoelectric elements 70 and 72 and is supported by them. A downward extending link 76 is pivotally attached to pin 74 and pivotally attached to the back of mirror 36. Mirror 36 is pivotally connected to side plates 32 and 34 at pivot 78.

As illustrated in an exaggerated fashion in FIGS. 3B and 3C, piezoelectric elements 70 and 72 distort dimensionally when an electric signal is applied to the piezoelectric element electrodes. By controlling the change in dimension of the piezoelectric elements 70 and 72, the tilt of mirror 36 can be precisely controlled, and the beam 12 tilted upward and downward as desired. As shown in FIG. 3B, the downward movement of the piezoelectric elements causes the link 76 to move downward and pivot mirror 36 slightly in a counterclockwise direction. This in turn changes the angle at which the beam 40 is reflected to mirror 42, and changes the direction of the beam 12 projected from the transmitter, causing it to be reflected slightly upward. Similarly, as shown in FIG. 3C, the upward movement of the piezoelectric elements cases the link 76 to move upward and pivot mirror 36 slightly in a clockwise direction. This changes the angle at which the beam 40 is reflected to mirror 42, and changes the direction of the beam 12 projected from the transmitter, causing it to be reflected slightly downward. As a consequence, the beam 12 may be directed to trace conical surfaces. The phrase conical surface is intended to include inverted conical surfaces as well as non-inverted conical surfaces. The elevation angle of the beam 12 leaving the transmitter can therefore be precisely controlled.

For example, as the beam is rotated relatively rapidly, it may be slowly swept upward and downward in a repeating pattern by the vertical elongation and contraction of the piezoelectric elements 70 and 72. The movement of the beam vertically can be effected in a stepwise fashion, i.e., the beam may be moved up or down to a predetermined angular orientation at the start of each rotation, or moved up or down to a predetermined orientation after having made a predetermined number of rotations at a previous orientation. Alternatively, the beam can be moved continuously slowly upward or downward as it rotates, defining a shallow spiral path. Alternatively, the beam may be moved to various inclinations, as needed, to continuously illuminate a laser receiver. A laser receiver at a point remote from the transmitter senses the beam of laser light, and this can be interpreted in a manner discussed below.

It will be appreciated that a number of variations in the construction of the beam diverting element 16 may be used. For example, if desired a single rotating mirror, oriented approximately at a 45° angle to the beam 40 may provide the diversion of the beam. Further, the pentaprism arrangement may incorporate a pivot for mirror 42 rather than for mirror 36.

Figure 4A:
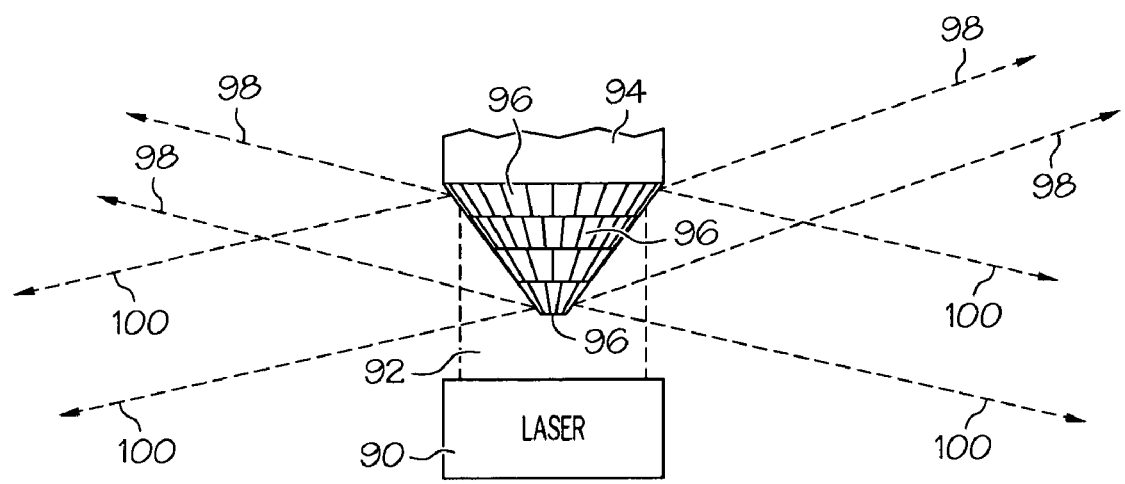
FIG. 4A is a side view of a transmitter, illustrating a diverting element that incorporates micro mirrors.
Figure 4B:
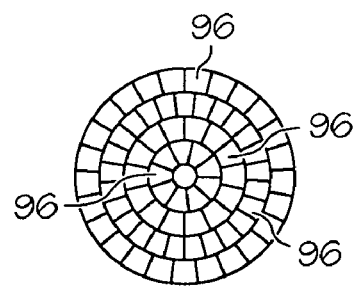
FIG. 4B is a view of the diverting element of FIG. 4A, as seen from below.

FIGS. 4A and 4B show a second embodiment of a transmitter constructed according to the present invention. Arrays of small mirrors, termed micro mirrors, have been developed for a number of different applications. Micro mirror arrays have been incorporated in high definition television systems, and in optical multiplexing and optical switching systems. Various array constructions are known in the art. "Magnetostrictive Micro Mirrors for an Optical Switch Matrix," Lee et al, published in *Sensors*, October 2007, pages 2174-2182, describes a magnetostrictive arrangement for mirror actuation, while "A Two-Axis Electrothermal Micro Mirror for Biomedical Imaging," 2003 IEEE/LEOS International Conference on Optical MEMS, August 2003, pages 14-15, describes a thermal actuation arrangement for micro mirrors. U.S. Pat. No. 7,354,167, issued Apr. 8, 2008, incorporated herein by reference, discloses micro mirror arrays that focus, deflect, and scan light beams, in which the mirrors are moved electrostatically or electromagnetically.

In the embodiment of FIGS. 4A and 4B, a laser 90 directs a beam 92 vertically toward a beam diverting element 94. Diverting element 94 in this embodiment includes an array of a large number of digital micro mirror devices 96 arranged collectively in the shape of an inverted truncated cone. Micro mirror devices are very small mirrors that can be mechanically pivoted between at least two positions. The micro mirror devices 96 are shown for simplicity of illustration in FIG. 4B, which is a view of the diverting element 94 as seen from below, as arranged in four concentric, circular rows. It will be appreciated, however, that a greater number of micro mirror devices arranged in a greater number of concentric circular rows will actually be utilized in the laser transmitter. In fact, the overall array of the beam diverting element 94 may include millions of hinge-mounted microscopic mirror devices, each of which has dimensions less than the width of a human hair. The micro mirrors in these devices can be tilted on their respective hinges by the application of electrical signals to associated electrodes at a high frequency, up to several thousand times per second. Such micro mirror device arrays are well known in the art.

When the micro mirrors are in a first position, the light in beam 92 will be reflected generally radially outward and upward, as illustrated by rays 98. When the micro mirrors are pivoted to a second position, the light in the beam 92 will be reflected generally radially outward and downward, as illustrated by rays 100. It will be appreciated that as the micro mirrors are switched between the first position and the second position, the light reflected by the mirrors will move from defining an inverted conical surface to a flat surface, and from a flat surface to a conical surface. When the mirrors are pivoted back from the second position to the first position, the light reflected by the mirrors will move from defining a conical surface, to defining a flat surface, and then to defining an inverted conical surface. By causing the micro mirrors to move rapidly and repeatedly between first and second positions, much of the area around the transmitter is swept by laser light.

The micro mirror devices 96 are preferably of the type which can be precisely controlled in their movement between the first and second positions shown in FIG. 4A, transitioning through a number of intermediate positions. For example, the mirrors may be stepped between the first and second positions in $1/10^{th}$ degree steps, with the mirrors being held in each successive intermediate position long enough for the reference plane of light to be sensed by a laser beam receiver, and the orientation of the beam to be utilized in assessing the relative position between the transmitter and the receiver. Alternatively, the mirrors may be moved to various intermediate positions in a predetermined series of moves, or moved to various intermediate positions according to some other scheme.

Figure 5A:
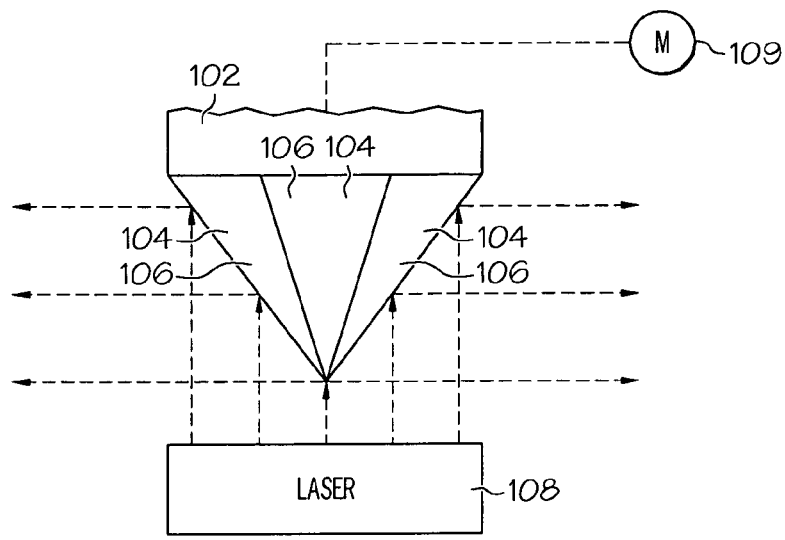
FIGS. 5A and 5B are views similar to FIGS. 4A and 4B, respectively, illustrating a diverting element in which the micro mirrors are arranged in an eight-sided regular pyramid.
Figure 5B:
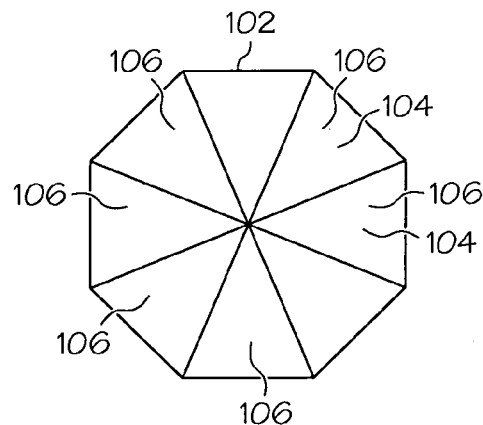

FIGS. 5A and 5B depict another embodiment of the transmitter of the present invention which is similar to the embodiment of FIGS. 4A and 4B, but with the inverted conical array of micro mirror elements 96 being replaced by a diverting element 102 having arrays of micro mirror elements 104 arranged as an inverted, eight-sided, regular pyramid. As is clear from consideration of FIGS. 5A and 5B, the separation of the micro mirror elements 104 into eight triangular panels 106 will result in the reflection outward of eight separate beams of laser light from laser 108, with each beam having a triangular cross section. In order to illuminate the area around the entire circumference of the transmitter, the diverting element 102 may be rotated continuously about a vertical axis by a motor indicated diagrammatically at 109. Alternatively, the diverting element 102 may be rotated back and forth about a vertical axis by at least one-eighth of a rotation. It will be appreciated that the micro mirror elements 96 in the embodiment of FIGS. 4A and 4B will also reflect a number of discrete rays, and that by rotating diverting element 94 in a similar manner, a greater area around the transmitter will be swept with laser light.

Figure 6:
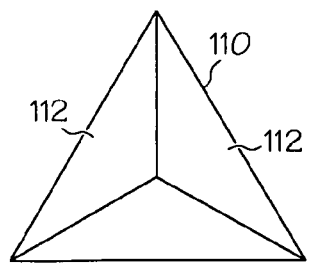
FIG. 6 illustrates a diverting element configured as a three-sided regular pyramid.
Figure 7:
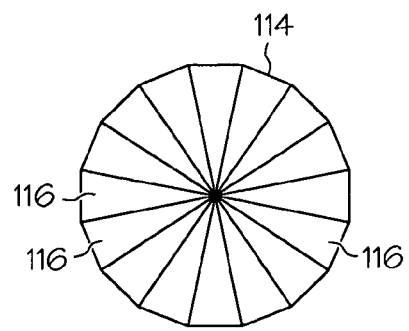
FIG. 7 illustrates a diverting element configured as a sixteen-sided regular pyramid.

Variations in the structure of the diverting element of the embodiment of FIGS. 5A and 5B are illustrated in FIGS. 6 and 7. In FIG. 6, a diverting element 110 has arrays of micro mirror elements 112 arranged as a three-sided, regular pyramid. In FIG. 7, a diverting element 114 has arrays of micro mirror elements 116 arranged as a sixteen-sided, regular pyramid. In both cases, the separation of the micro mirror elements into a plurality of panels will result in the reflection outward of a plurality of separate beams of light. Three such beams will result from the diverting element 110 in FIG. 6, and sixteen such beams will result from the diverting element 114 in FIG. 7. In both cases, the diverting element may either be rotated continuously, or rotated back and forth about a vertical axis of rotation, to provide for complete beam coverage around the circumference of the diverting element.

It will be appreciated that the laser transmitters of FIGS. 4A, 4B, 5A, 5B, 6 and 7 have all been described as producing a conical reference plane of laser light, or an approximation of a conical plane of laser light, that is projected radially outward simultaneously in all directions. This does not produce a beam that is rotated about the central axis of the transmitter, as is the case with the transmitter of FIGS. 1, 2, 3A, 3B, and 3C. It should also be understood, however, that the rotation of the beam may be simulated with the transmitter of FIGS. 4A, 4B, 5A, 5B, 6 and 7 by actuating each of the micro mirrors separately. For example, a micro mirror or cluster of micro mirrors, may be actuated to direct the beam to a predetermined point at a certain azimuth angle and elevation angle. The balance of the light from the laser is deflected by the micro mirrors that are not actuated to locations that are not of interests. Next, the micro mirror or cluster of micro mirrors adjacent to the first actuated micro mirror or cluster of micro mirrors, is actuated. This produces the deflection of the beam at the same deflection angle but at a slightly different azimuth angle. By actuating adjacent micro mirrors, or adjacent clusters of micro mirrors, in sequence around the periphery of the diverting element, a spinning beam of laser light can be simulated. Techniques to determine the azimuth angle of the spinning beam at the instant when it strikes a laser receiver can then be implemented with the transmitter operating in this mode.

Figure 8:
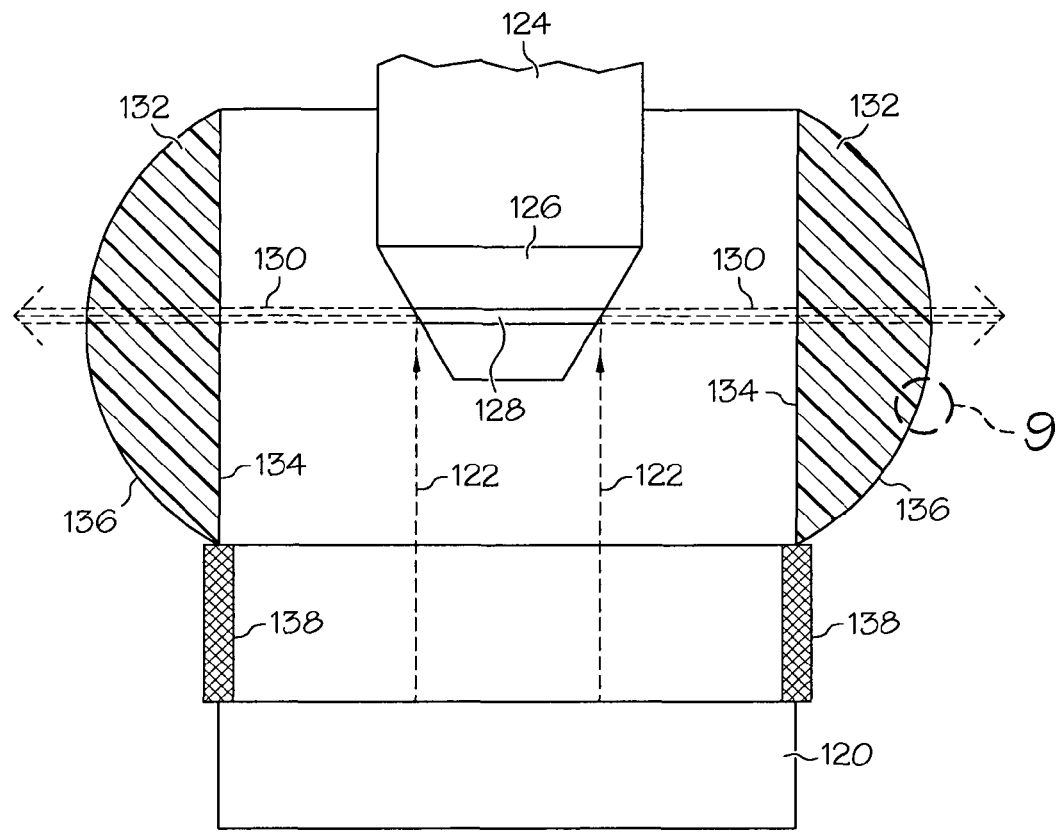
FIG. 8 is a side, sectional view of another embodiment of the invention, incorporating an annular lens.

FIG. 8 illustrates yet another embodiment of the transmitter of the present invention. A laser 120 provides a vertically directed beam of laser light 122 which is received by a diverting element 124. The beam 122 strikes the inverted conical surface 126 of diverting element 124, and the portion of the beam which strikes thin, mirrored band 128 is reflected radially outward, defining a horizontal band of laser light 130. The reflected band of laser light 130 passes radially outward through an annular lens 132. Annular lens 132 has a cylindrical inner surface 134 and a convex outer surface 136. The annular lens 132 is supported by an annular piezoelectric element 138 which, when electrically stimulated, changes vertical dimension. By controlling the level and the polarity of the electrical stimulation signal, the piezoelectric element 138 is caused to raise and lower the annular lens 132 as desired. It will be appreciated that when a ray of light exits the lens 132 precisely in the middle of the lens, it will pass outward without changing direction. When the lens 132 has been moved downward from the position illustrated in FIG. 8, however, the ray will be refracted downward. Similarly, if a ray of light passes through the lower half of the lens 132 when the lens 132 is raised above the position shown in FIG. 8, the ray will be refracted upward. As a consequence, by moving the lens 132 upward and downward, the band of laser light generated by the light reflected from mirrored band 128 is caused to sweep downward and upward, defining a variety of conical reference surfaces.

It will be appreciated that all of the rays of light in the band 130 that are reflected outward from the mirrored surface 128 will not emerge from the lens 132 at precisely the same angle. Because of the curvature of the lens surface 136, when the band of light 130 passes through the upper half of the lens 132, a ray at the upper surface of the band of light 130 will be directed downward at a slightly greater angle than a ray at the lower surface of the band of light 130. As a consequence, these rays will tend to converge toward a point some distance from the lens 132, producing a band of light that becomes thinner at a distance from the apparatus, and then thickens somewhat beyond that point.

Figure 9:
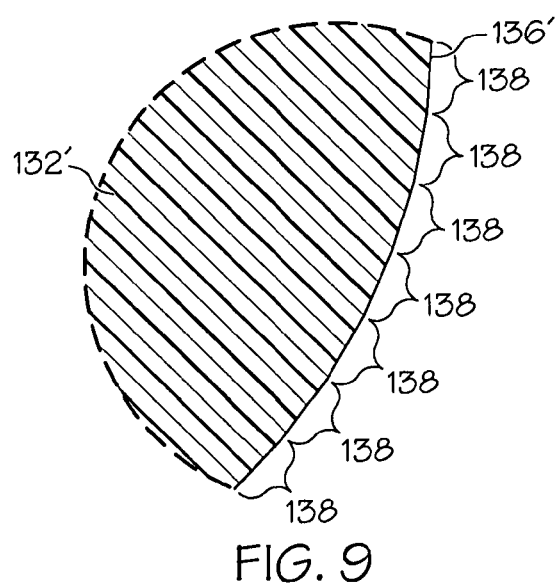
FIG. 9 is an enlarged sectional view of a modified version of the annular lens in which the outer surface is configured as a series of truncated, conical surfaces.

FIG. 9 is an enlarged partial sectional view of a modified lens 132' of another embodiment of the apparatus for projecting a reference laser light beam. FIG. 9 is taken generally in the area of the reference circle 9 shown in FIG. 8. All of the components of this embodiment are the same as those in the embodiment of FIG. 8, with the exception of the modified lens 132'. In the embodiment of FIG. 8, the outer surface 136 of the lens 132 is a smooth, convex shape in cross-section. In the embodiment of FIG. 9, on the other hand, the outer surface 136' of the lens 132' is not a smooth curved surface. Rather, the surface 136' is subdivided into a series of frusto-conical surface segments 138 which each extend circumferentially around the outside of the lens 132'. By this arrangement, when the band of light 130 is exiting the lens 132' through one surface segment, all of the rays of light in the band are refracted by the same angle. This results in no narrowing of the refracted band of light 130. The lens 132' of FIG. 9, however, produces a band of light that steps or jumps from one angle of refraction to the next as the band of light passes over the discontinuity between one frusto-conical surface segment 138 and the next frusto-conical surface segment 138. Although referenced herein as lens 132', it will be appreciated that element 132' could also be described as an optical wedge element having surfaces oriented at varying angles to produce varying amounts of refraction.

Figure 10:
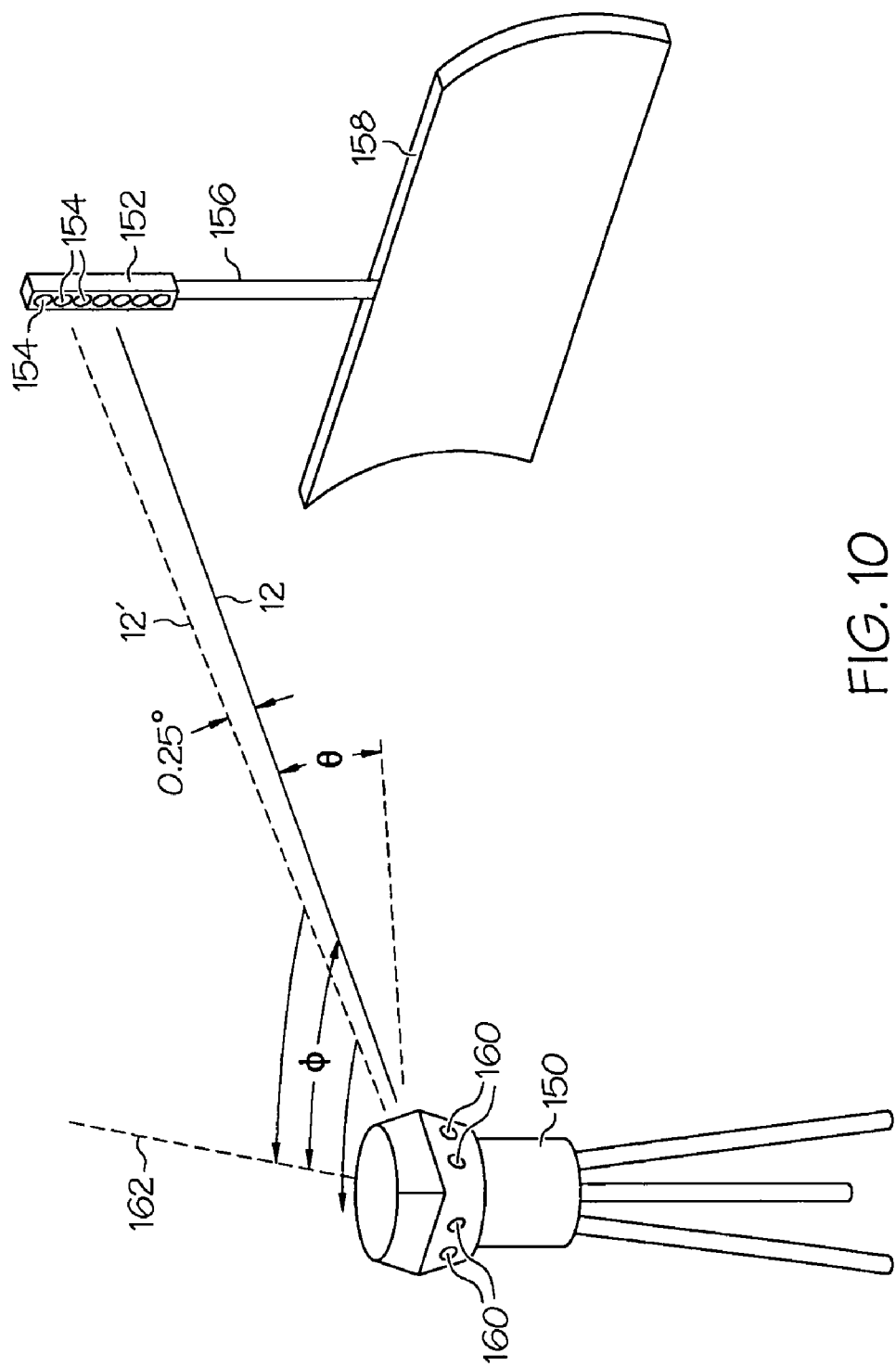
FIG. 10 illustrates the use of a transmitter according to the present invention.
Figure 11:
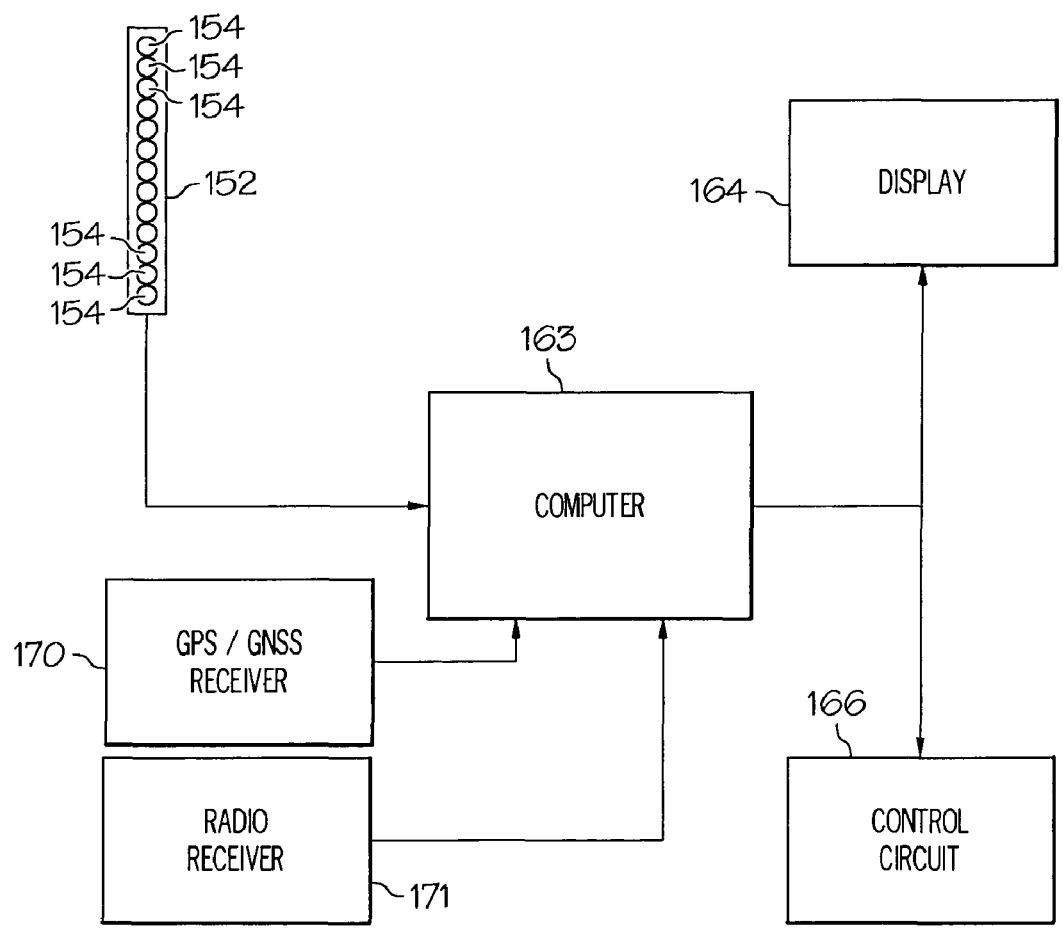
FIG. 11 is an electrical schematic diagram of circuitry associated with the laser receiver used with the present invention.

It will be appreciated that the laser transmitter of the present invention may be paired with an appropriate laser receiver to measure the location of the laser receiver relative to the laser transmitter in a number of ways, and that this location information can then be used, if desired, to control the operation of a machine on which the laser receiver is mounted. An example of such an arrangement is shown in FIG. 10. A transmitter 150 of the type shown in FIGS. 1 through 3 is used in conjunction with a receiver 152 having multiple photosensors 154. The receiver 152 is mounted on a mast 156 which is secured to a machine, depicted as the blade 158 of a grader or similar machine. The transmitter 150 further includes a plurality of strobe lights which are positioned around the entire circumference of the transmitter. Such an arrangement of strobe lights on a transmitter is disclosed in U.S. Pat. Nos. 6,643,004, issued Nov. 4, 2003, to Detweiler et al, the relevant portion of the disclosure of which is incorporated herein by reference. The transmitter of FIG. 10 marks the position of the rotating beam with the flashing of the strobe lights in the same way that this is accomplished in the '004 patent with respect to fan beams. The beam 12 is rotated about a vertical axis and as the beam 12 passes a reference direction, such as due north, indicated by dashed line 162, the strobe lights 160 are all strobed simultaneously. The receiver 152 senses each successive strobe flash as well as the passage of the beam 12 and, from a timing comparison, the relative heading of the receiver 152 from the transmitter 150 can be determined. As shown in FIG. 11, this determination may be made by computer 163 and displayed on a display 164 for use by the operator of a machine. Additionally, this information may be used by machine control circuit 166 for automated control of the machine.

It will be appreciated that illumination of the receiver 152 by a flash of the strobe lights can be distinguished from illumination of the receiver 152 by the beam 12 by using any of a number of techniques. One such technique distinguishes these two illumination situations by the number of sensors 154 that are illuminated. This is disclosed in U.S. Pat. No. 7,119,316, issued Oct. 10, 2006 to Green et al, the disclosure of which is incorporated by reference herein. Another approach is shown in U.S. Pat. No. 7,224,473, issued May 29, 2007, to Zalusky, the disclosure of which is incorporated by reference herein. As shown in the '473 patent, a laser receiver uses an additional photodetector to distinguish the strobe pulses of light from the rotating beam, with the additional photodetector being spaced from the balance of the photodetectors.

FIGS. 12A, 12B and 12C collectively illustrate one mode of operation of the laser transmitter. The continuous rotation of the beam 12 is illustrated in FIG. 12A. When the beam 12 reaches a reference azimuth angle, such as 0°, the strobe lights 160 are pulsed as shown in FIG. 12B. The receiver 152 detects the strobe pulses and subsequently detects the illumination of the receiver by the rotating beam 12. The point during the rotation cycle at which the beam 12 is detected is an indication of the azimuth angle of the receiver.

FIG. 12C shows the elevation angle $\Theta$ during successive rotations. Note that in this mode of operation, the elevation angle is maintained at a constant value over three rotations before being changed to a different elevation angle for the next three rotations. As an example, a portion of the operation cycle in which the beam is being raised in 0.25° increments is illustrated. By keeping the elevation angle constant over more than one rotation of the beam, the detected beam position can be averaged to achieve greater accuracy. This may be desirable if the transmitter and receiver are operating over longer distances in an environment in which the beam may be subject to thermal refraction. The elevation angle of the beam is raised from a minimum elevation angle in uniform increments until a maximum elevation angle is reached, at which time the process is reversed, and the beam is lowered in uniform increments until the minimum elevation angle is reached. This process is repeated continuously, with the beam going up and down. The elevation angle is preferably incremented in uniform steps according to a schedule, as shown in FIG. 12C. The computer 163 can keep track of the number of strobe pulses received by laser receiver 152 and in this way determine the current elevation angle of the beam 12. A double strobe light pulse may be provided when the beam 12 reaches its lowest point in its cyclical movement, and subsequent angles may be simply determined by keeping track of the number of incremental changes (illustrated as 0.25° steps). Beam 12' is illustrated diagrammatically as having moved upward by an incremental step from a previous elevation angle.

An alternative way of keeping track of the scheduled raising and lowering of the beam of laser light is to use a fixed time schedule for a complete cycle. The time of the start of the cycle can be determined by a GPS-based clock if both the laser transmitter and the laser receiver include GPS receivers. For example, at the start of each minute, the beam may be oriented at its lowest elevation angle. During the course of the minute the beam may be cycled through a number of orientations, returning to the lowest elevation angle at the end of the minute period so that the cycle can be repeated during the next minute. The cycle time, the steps by which the laser beam is reoriented, and the sequence of those reorientation steps may be adjusted by the user. The various orientations to which the beam is moved can be widely varying and need not be selected in any particular order.

Figure 13:
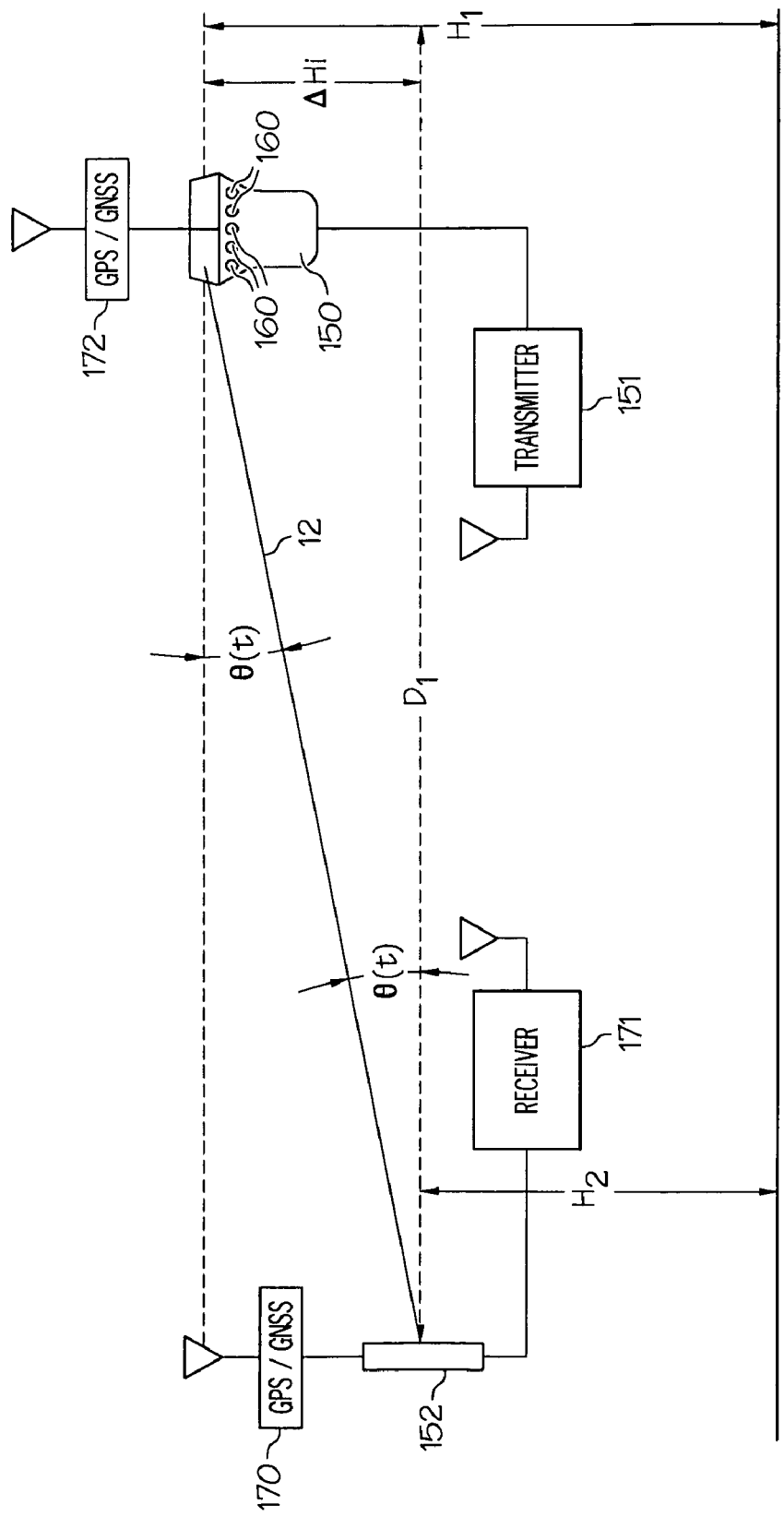
FIG. 13 is a schematic drawing of a laser transmitter and laser receiver according to the present invention, illustrating the manner in which the relative height of the receiver may be determined.

As shown in FIG. 13, a radio transmitter 151 on the laser transmitter 150 may be used to transmit information to a radio receiver 171 associated with computer 163 (FIG. 11), and eliminate the need for the strobe lights 160 or a timed schedule. The radio transmitter 151 transmits a radio signal, indicating the azimuth angle of the beam 12 with respect to a reference azimuth position. This permits the azimuth angle ϕ to be measured. The system also determines the angle of elevation Θ of the beam 12 with respect to the laser transmitter 150, and transmits this continuously, as well, via a radio link to receiver 171 so that when laser receiver 152 detects the beam 12, the elevation angle Θ of the laser receiver 152 with respect to the laser transmitter 150 is also precisely known. A control circuit 166 (FIG. 11) may receive an output from computer 163 for controlling the operation of the machine based in part on the detected azimuth angle and elevation angle from the transmitter, assuming that the laser transmitter is located at a known position. The distance between the laser transmitter 150 and the laser receiver 152 may be determined in any of a number of ways, or additional position information for the receiver 152 can be assessed using various techniques. For example, as shown in FIG. 13, a GPS/GNSS receiver 170 may be located at the laser receiver 152, thus providing the position of the receiver 152 in either a GPS/WGS-84 coordinate system or in transformed local coordinates (Northing and Easting relative to a local reference point.). A similar GPS/GNSS receiver 172 may be located at the laser transmitter 150, providing its location as well. The position of the laser transmitter 150 is then provided to the laser receiver system and its associated processor via a radio link from transmitter 151 to receiver 171. Alternatively, the laser beam itself may be modulated to carry this information. The processor associated with the laser detector generally determines the distance $D_1$ between the laser transmitter and the laser detector, in a horizontal plane, forming the base of a triangle. Knowing the calculated distance between laser transmitter 150 and the laser receiver 152, and knowing the elevation angle relationship for the laser transmission, the height of the laser detector can be determined from basic trigonometry. In the example in FIG. 13, the laser detector processor can determine the time of the laser strike on receiver 152, look in a table or make a calculation based on time of strike, determine the laser beam elevation angle $\Theta(t_1)$, determine the distance $D_1$ between the laser detector 152 and the laser transmitter 150, and then perform the following calculation:

$$H_2 = H_1 - D_1 * \tan[\Theta(t)].$$

$D_1 \tan[\Theta_i]$ is the difference in height between the laser transmitter and the laser detector. This process may be repeated many times until a sufficient accuracy is obtained, or done once, as may be determined by the user.

The transmitter 150 can also be operated in a manner in which the beam 12 is raised and lowered in a continuous manner, rather than a step-wise fashion. If the beam 12 is continuously raised and lowered, a radio transmitter associated with the laser transmitter 150 will transmit azimuth angle and elevation angle data continuously so that that detection of the beam 12 by laser receiver 152 will provide azimuth and elevation information. Similarly, with such an arrangement the beam 12 may be raised and lowered in a random or pseudo-random manner.

Figure 14:
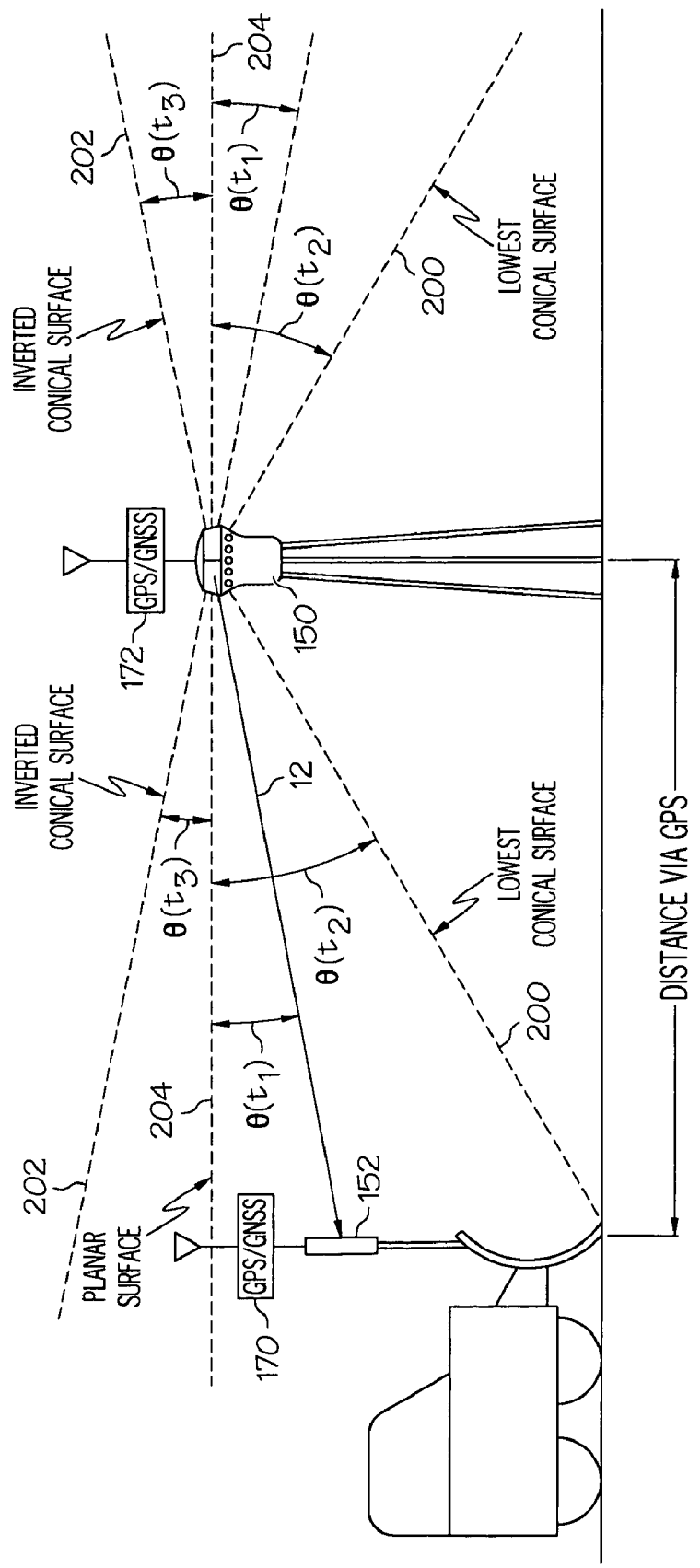
FIG. 14 is a schematic drawing, similar to FIGS. 10 and 13, illustrating a laser transmitter and laser receiver, each with an associated GPS receiver, and useful in understanding the operation of the transmitter of the present invention.

FIG. 14 shows the method of projecting a reference plane of laser light, produced by a transmitter 150 according to the teachings of the instant disclosure. In this method, the beam 12 is periodically, regularly raised and lowered. Because the beam 12 is continuously spinning or is projected simultaneously around 360°, it effectively defines a conical surface. The conical surface changes shape, oscillating between a surface having its lowest orientation at 200, and a surface having its highest orientation at 202, each time passing through an orientation in which it defines a planar surface 204. As referenced against the orientation of the planar surface 204, the beam 12 strikes the receiver when it is tipped downward by an angle of $\Theta(t_1)$, it reaches its lowest position at an angle of $\Theta(t_2)$, and it reaches its highest position at an angle of $\Theta(t_3)$.

Figure 15:
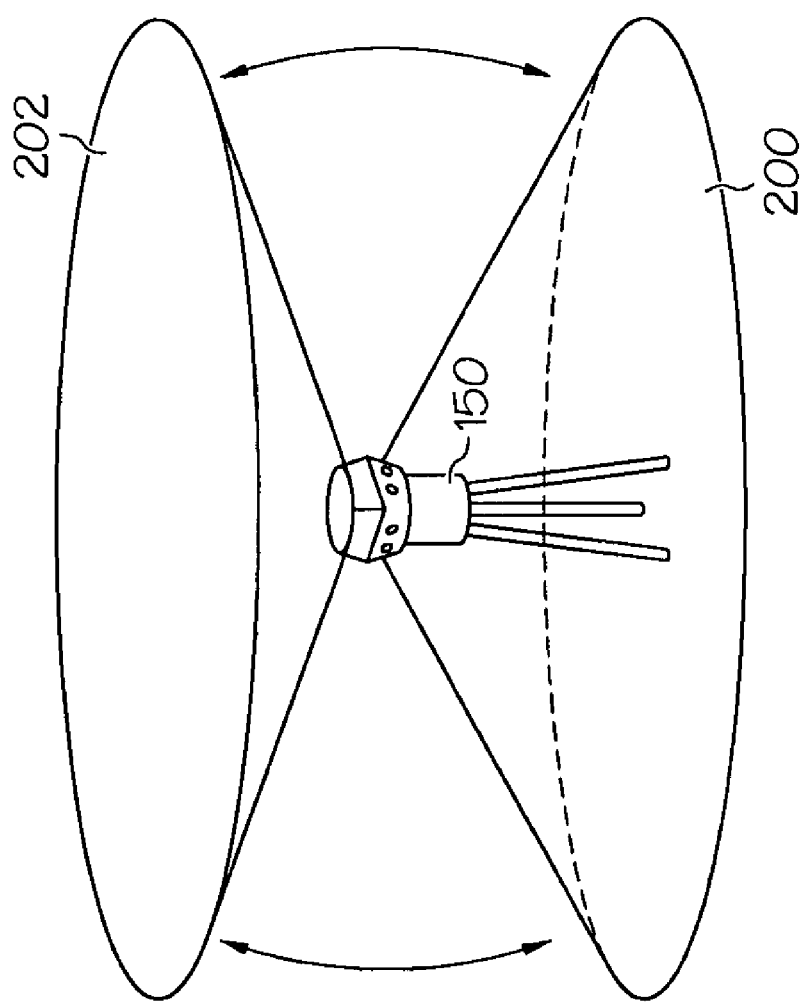
FIG. 15 is a perspective, diagrammatic representation of the laser transmitter, illustrating the movement of the laser light to define various reference surfaces.

Several points will be apparent from a review of FIG. 14. First, the movement of the beam 12 need not be symmetrical. That is, the limits of movement above and below a planar surface 204 of beam 12 need not be equal: $\Theta(t_2) \neq \Theta(t_3)$. In fact, depending on the location of the transmitter 150 at the construction site or worksite, and the anticipated positions of the machine or machines that will be using the moving beam 12 as a reference, the laser transmitter 150 may be operated with the beam 12 oscillating and remaining above a horizontal plane, or the laser transmitter 150 may be operated with the beam 12 oscillating and remaining below a horizontal plane. In such a situation, the beam defines only conical surfaces of varying vertex angles which remain above or below the horizontal plane. This can be analogized somewhat to the movement of a surface defined by the ribs of an umbrella which is repeatedly moved between two different, partially open positions. FIG. 15 depicts the movement of the beam 12 between the inverted conical surface 202 and the conical surface 200 in a diagrammatic perspective. It will be noted that in order to represent the surfaces 202 and 200 as conical in shape, an outer, circular edge is shown for each of the surfaces. In actuality, the conical surfaces extend outward an indefinite distance, with the light in the beam 12 dropping in intensity inversely in relation to the square of the distance. It will also be appreciated that the beam of light need not be swept up and down cyclically, but can be stepped to a series of desired elevations in any desired order or sequence.

Figure 16:
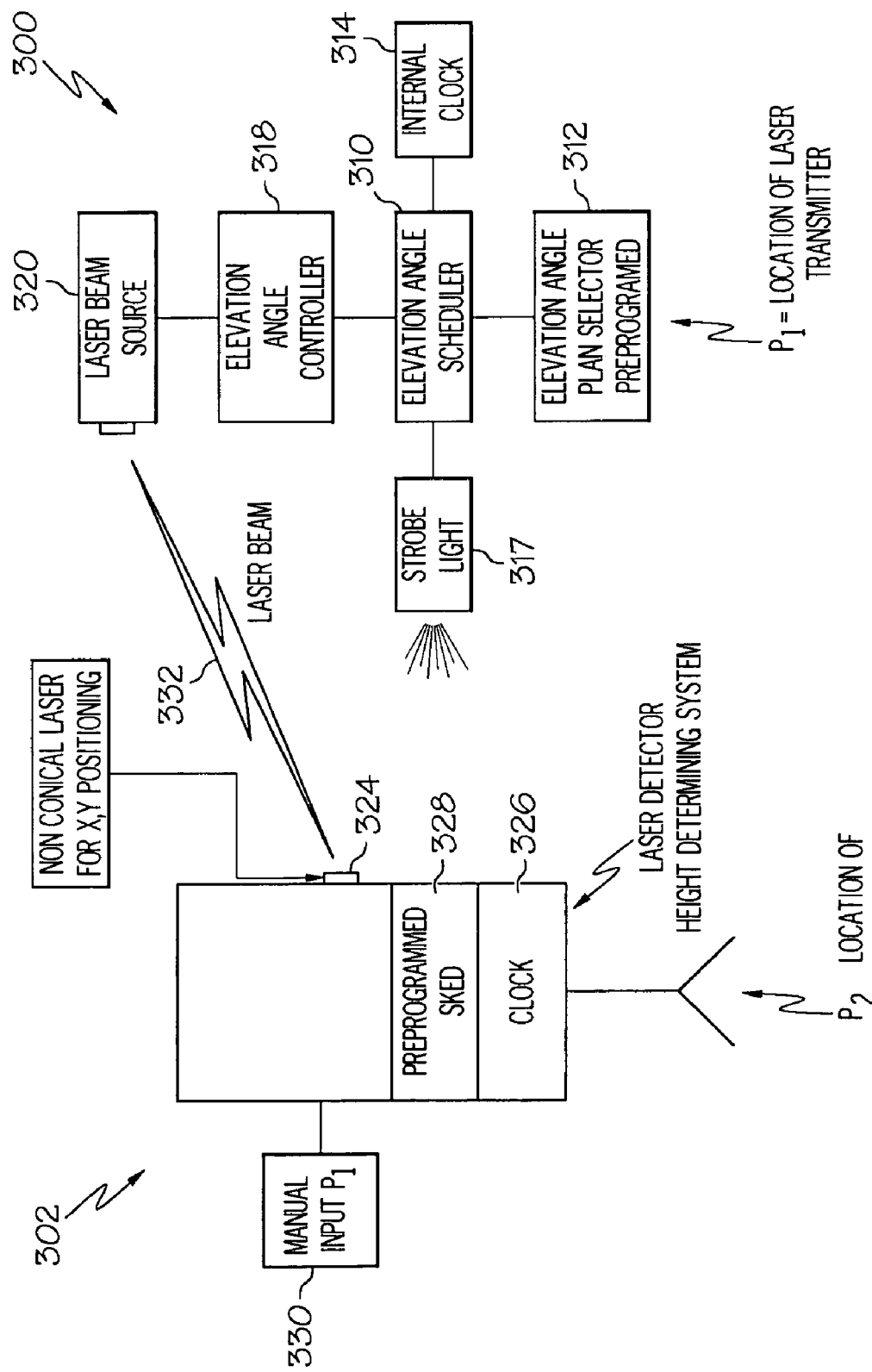
FIGS. 16 through 20 show a number of laser and transmitter systems.

Reference is made to FIGS. 16-20 which are diagrammatic representations of laser based systems according to the present invention, each including a laser transmitter 300 and a laser receiver 302. Laser transmitter 300 may be any of the laser transmitters shown in FIGS. 1-9, above, which project a laser beam defining a conical surface of controlled, varying inclination. As seen in FIG. 16, the laser transmitter 300 has a number of components, including an elevation angle plan selector preprogrammed 312, an elevation angle scheduler 310, an internal clock 314, an elevation angle controller 318, and the laser beam source 320. The transmitter 300 further includes a strobe light arrangement 317. The laser receiver 302 includes at least one laser light sensor 324, a clock 326, and memory 328 in which data defining the schedule of vertical movement of the reference laser light surface is stored. The laser receiver 302 may also include a keyboard or other manual input arrangement 330 which permits the user to input the position of the transmitter 300. The receiver 302 determines the coordinates of its position by reception of laser signals from non-conical laser transmitter 332. This may advantageously consist of two transmitters which are located at known reference locations to permit triangulation of the location of the laser receiver P₂. The receiver 302 is capable of determining its relative height with respect to the transmitter 300 by determining the angle of the beam 332 when the receiver 302 senses the beam. The schedule of beam movement in the memory 328 may be conveyed from the elevation angle schedule 310 in a number of ways. It may be preloaded into both the transmitter 300 and the receiver 302, and be time dependent. That is, the time of day determines the elevation angle of the beam. Alternatively, the beam elevation angle may be stepped to successive values in synchronism with the strobe pulses from strobe light 316. The schedule of beam movement may be transmitted wirelessly from the scheduler 310 to the receiver 302, or may be conveyed from the transmitter to the receiver. For example, the schedule of beam movement may be transmitted over the laser beam 332 to the receiver 302, or loaded into memory from a memory storage device that is manually coupled to a connector on the receiver 302.

Figure 17:
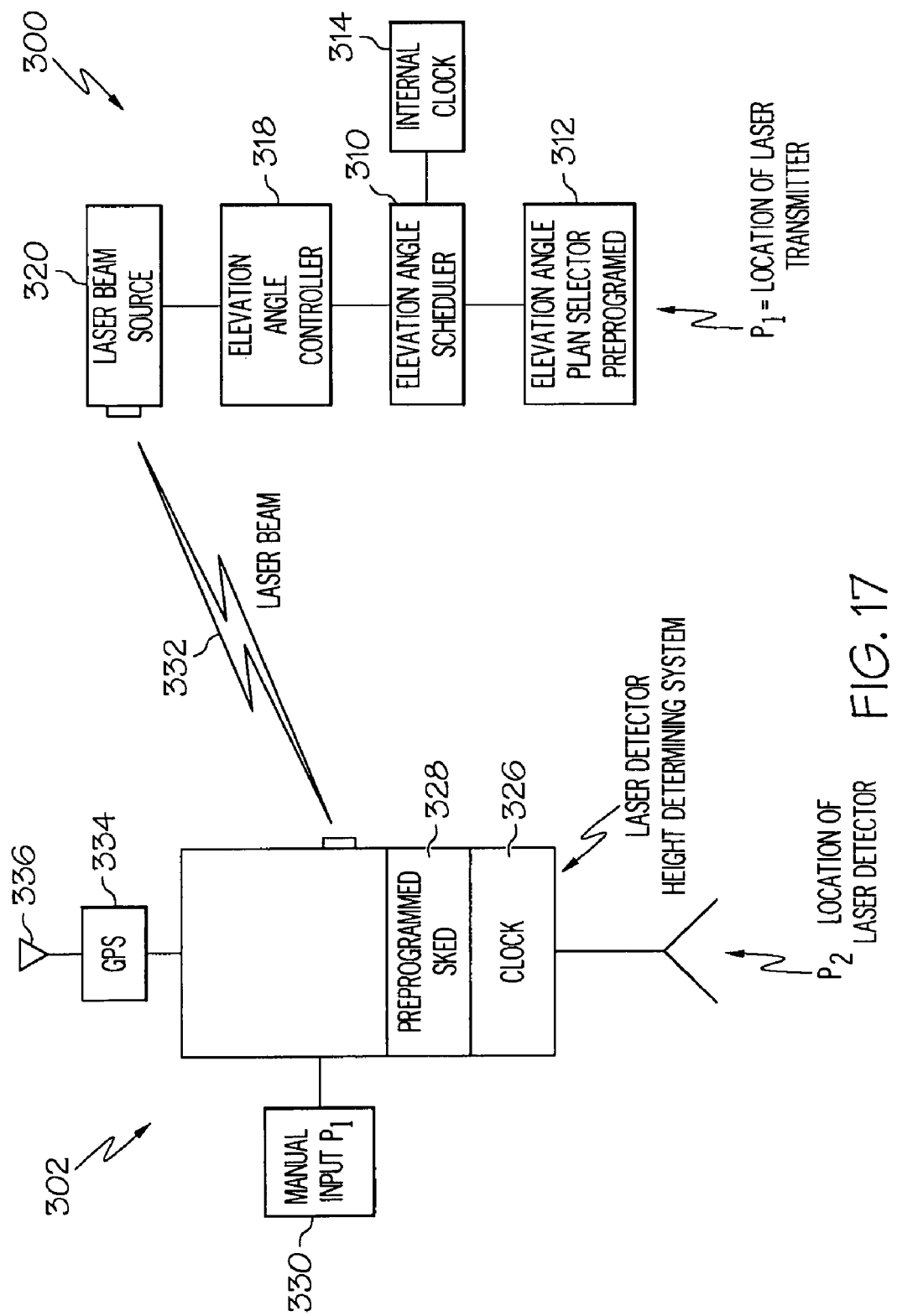
Figure 18:
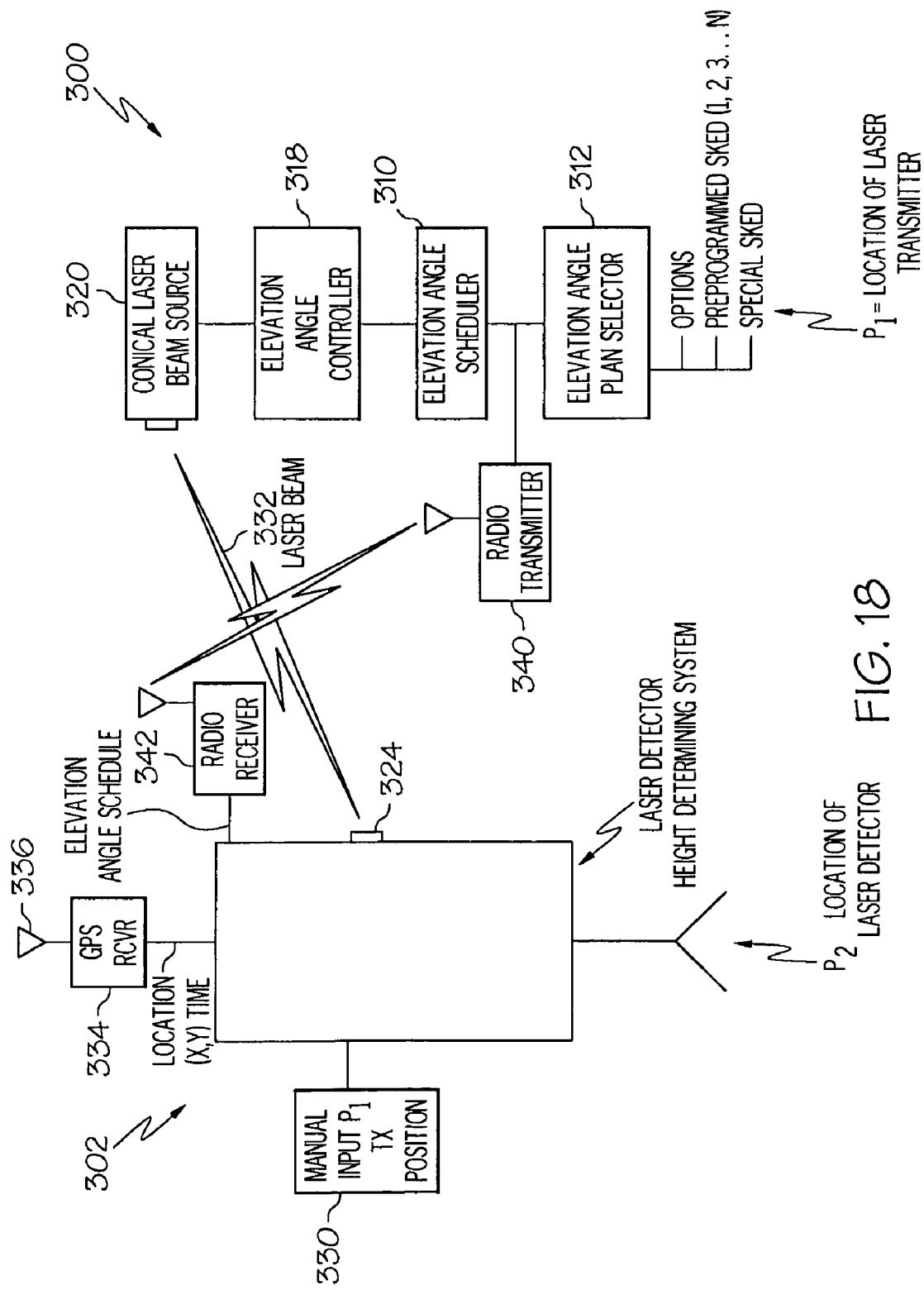
Figure 19:
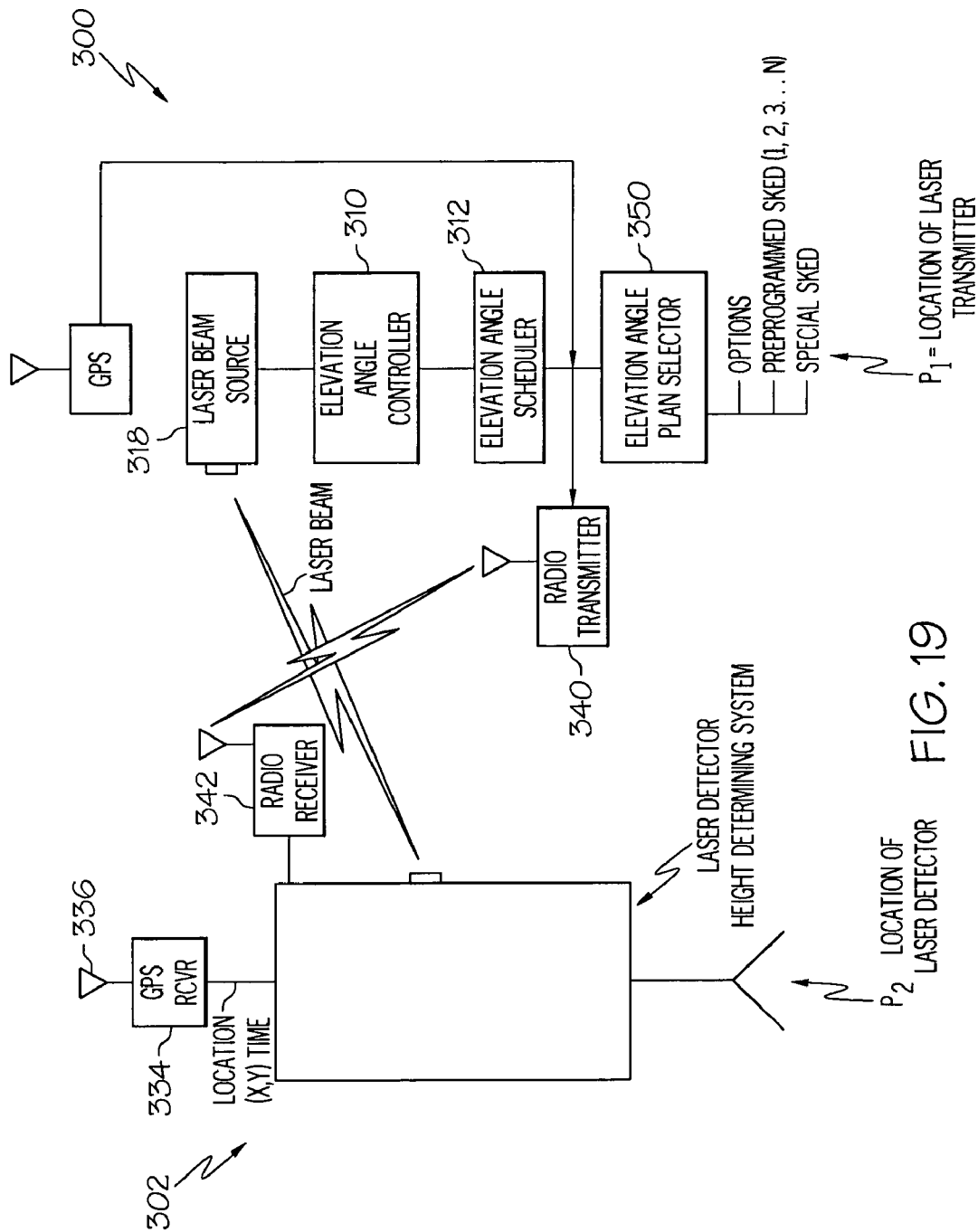

FIG. 17 shows the receiver 302 with a GPS receiver 334 and GPS antenna 336 for determining the location of the laser receiver P₂. FIG. 18 shows the laser transmitter 300 with a radio transmitter 340 and the laser receiver 302 with a radio receiver 342 providing a radio link between the laser transmitter and the laser receiver 302 for the transmission of elevation and azimuth angle information. Finally, FIG. 19 shows a system in which both the transmitter 300 and the receiver 302 include GPS receivers for establishing their respective locations, as well as providing time of day information very precisely if a time of day schedule for raising and lowering the beam 332 is utilized. The transmitter 300 further includes an elevation angle plan selector 350 that permits the operator to select from among a number of predetermined schedules.

Figure 20:
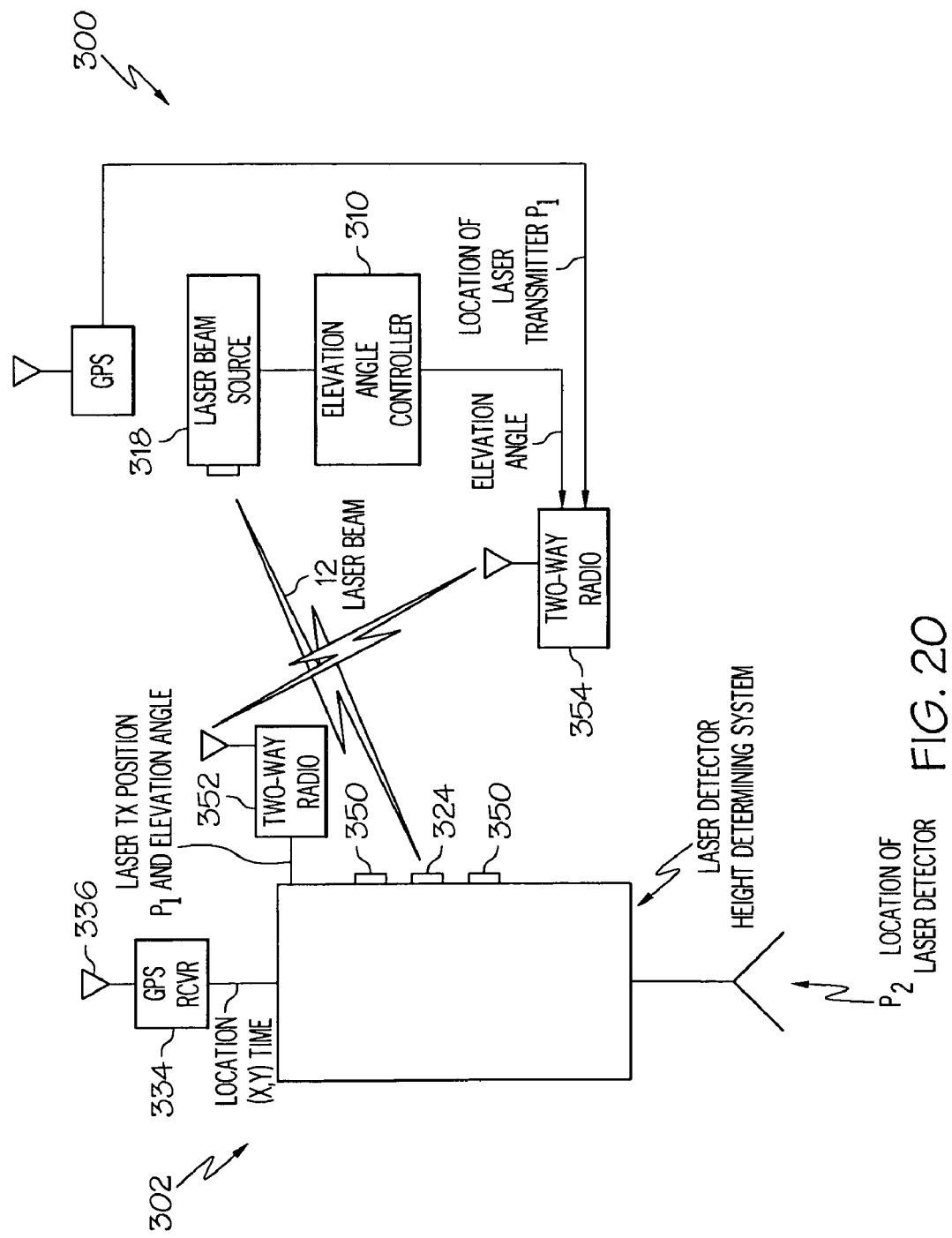

FIG. 20 shows a system similar to that of FIG. 19, in which the radios 340 and 342 are two-way radios or transceivers. In this system, the receiver 302 senses when the elevation angle of the beam 12 needs to be adjusted to keep the detector 324 illuminated. This may be accomplished by providing additional detectors 350 above and below detector 324. When the beam 12 is to be adjusted, radio transceiver 352 sends a signal to transceiver 354. The transmitter 300 adjusts the elevation angle of beam 12 until detector 324 is illuminated. The transceiver 354 then sends transceiver 352 azimuth angle, elevation angle, and location data.

Other aspects, objects, and advantages of the present invention can be obtained from a study of the drawings, the disclosure, and the appended claims.

What is claimed is:

1. A laser transmitter for projecting a beam of laser light outward while raising and lowering the beam to define conical surfaces of varying inclination, comprising:
    a laser source directing a beam generally vertically,
    a beam diverting element in the path of the beam, intercepting the beam and redirecting it to emerge from the transmitter as a non-vertical beam that is raised and lowered to provide conical reference surfaces of varying inclination, said beam diverting element includes a conical reflective surface intercepting the beam and redirecting it outward as a thin, horizontally diverging, generally horizontal beam, an annular lens having a cylindrical inner surface and a convex outer surface, and a piezoelectric element for raising and lowering said annular lens, said annular lens altering the elevation angle direction of said beam, such that said beam elevation angle is raised and lowered.

2. The laser transmitter of claim 1, in which the outer surface of said annular lens is subdivided into a series of frusto-conical surface segments, each of which extends circumferentially around the outside of the lens, such that all of the light in the beam passes through each surface segment for refraction by the same angle.

3. A laser transmitter for projecting a beam of laser light outward while raising and lowering the beam to define conical surfaces of varying inclination, comprising:
    a laser source directing a beam generally vertically,
    a beam diverting element in the path of the beam, intercepting the beam and redirecting it to emerge from the transmitter as a non-vertical beam that is raised and lowered to provide conical reference surfaces of varying inclination, said beam diverting element includes a reflective surface intercepting the beam and redirecting it outwardly, an annular lens having a convex outer surface, and a piezoelectric element for raising and lowering said annular lens, said annular lens altering the elevation angle direction of said beam, such that said beam elevation angle is raised and lowered.

4. The laser transmitter of claim 3, in which the outer surface of said annular lens is subdivided into a series of surface segments, each of which extends circumferentially around the outside of said lens, such that the light passing through a surface segment is refracted by an angle determined by the surface segment.

* * * * *